Nov. 2, 1971   L. PLEET   3,616,792
ILLUMINATING SURGICAL SPECULA
Filed April 10, 1969   3 Sheets-Sheet 1
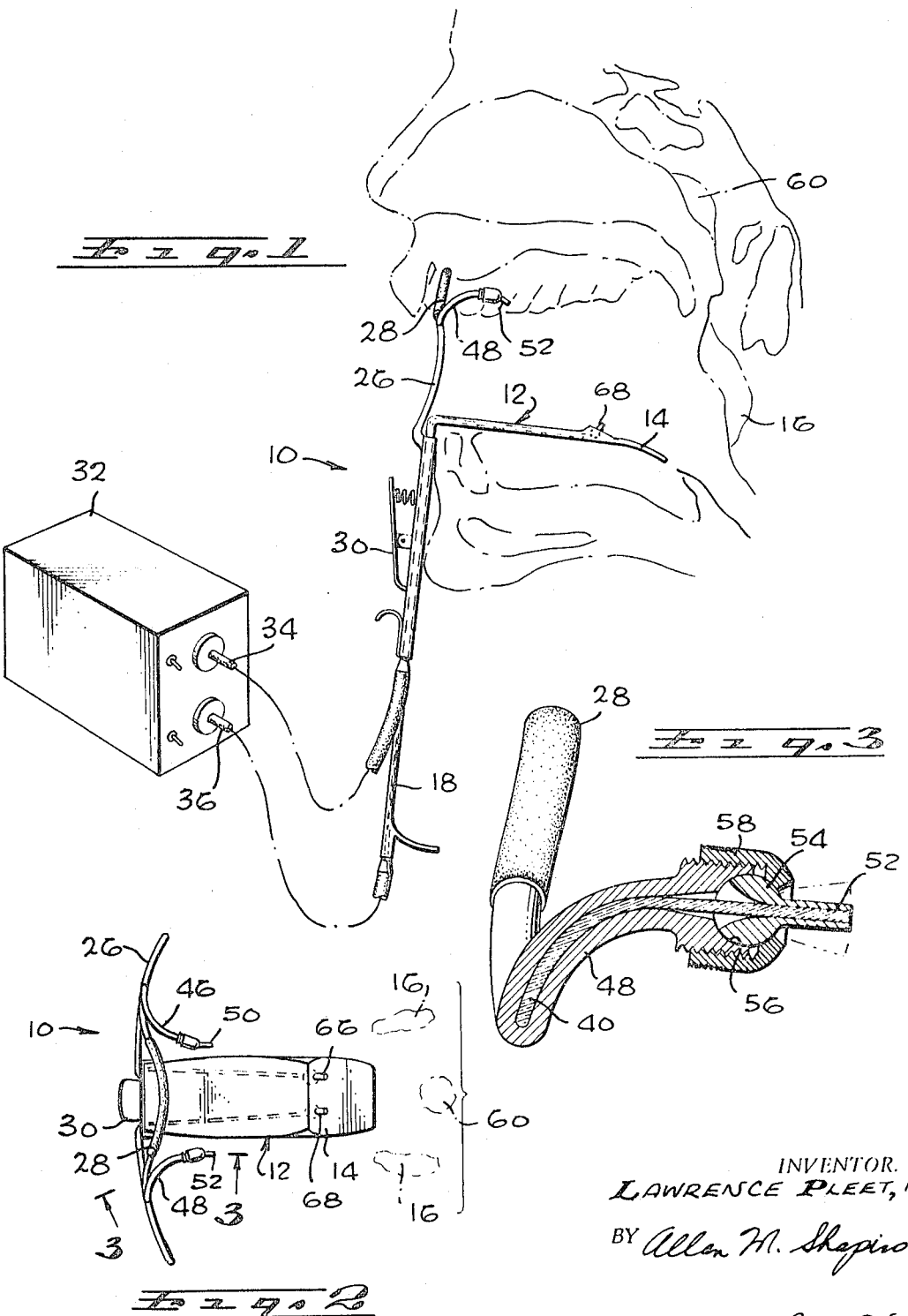
INVENTOR.
LAWRENCE PLEET, M.D.
BY Allen M. Shapiro
ATTORNEY

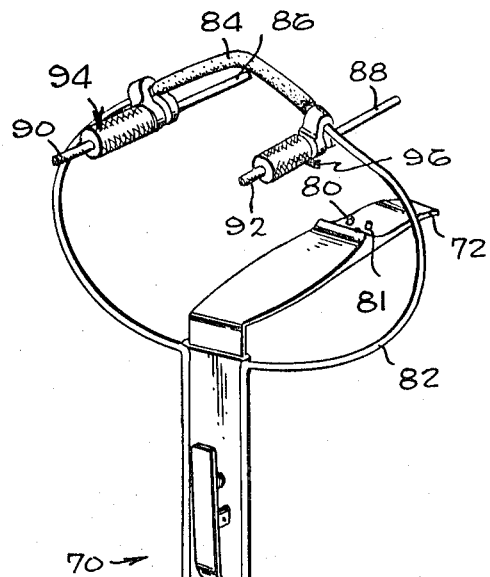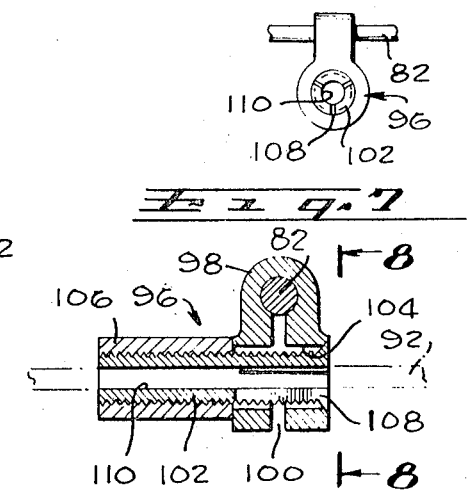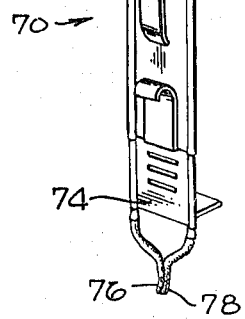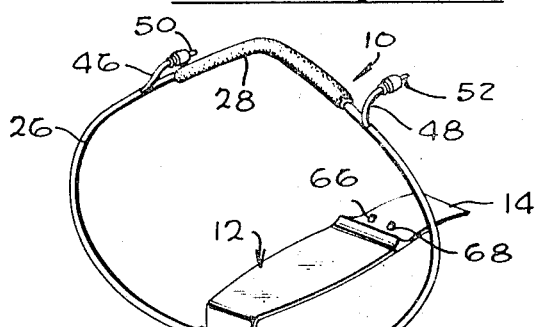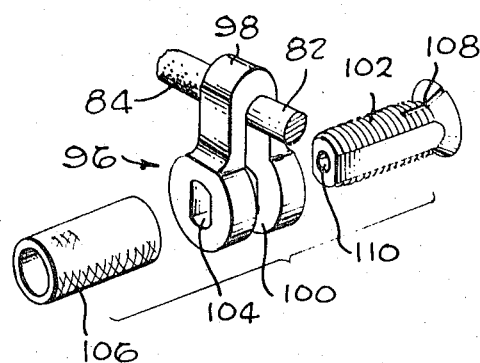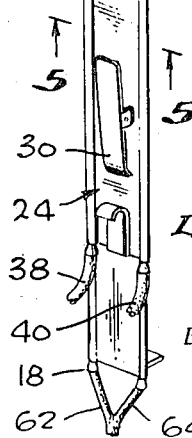

Nov. 2, 1971  L. PLEET  3,616,792
ILLUMINATING SURGICAL SPECULA
Filed April 10, 1969  3 Sheets-Sheet 3
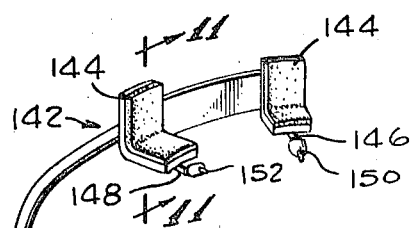
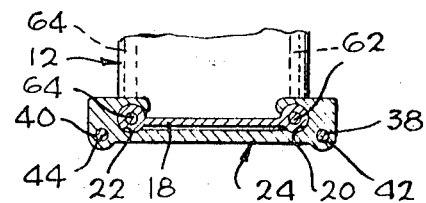
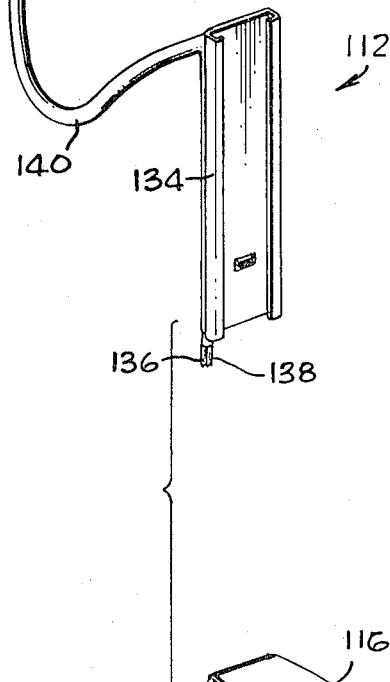
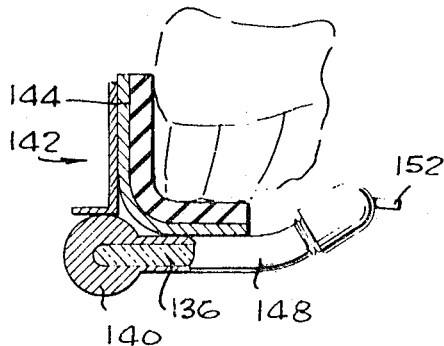
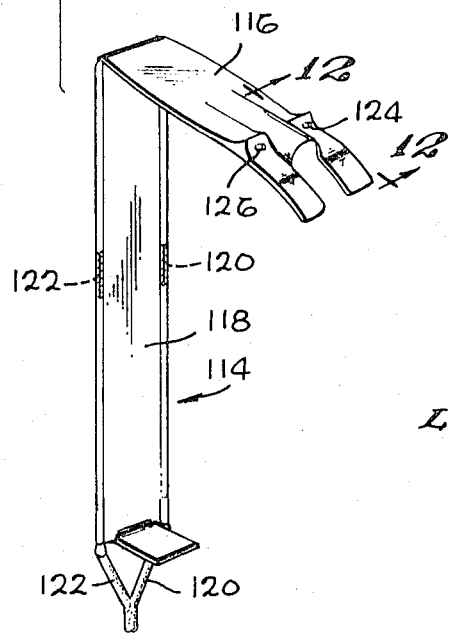
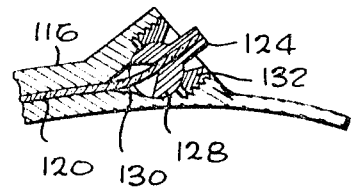
LAWRENCE PLEET, M.D.
INVENTOR.
BY Allan M. Shapiro
ATTORNEY United States Patent Office 3,616,792
Patented Nov. 2, 1971

3,616,792
ILLUMINATING SURGICAL SPECULA
Lawrence Pleet, Los Angeles, Calif.
(18851 Pasadero Drive, Tarzana, Calif. 91356)
Filed Apr. 10, 1969, Ser. No. 815,096
Int. Cl. A61b 1/06, 1/24; G02b 5/16
U.S. Cl. 128—11                                       3 Claims

ABSTRACT OF THE DISCLOSURE

Illuminating surgical specula combining the features of ordinary specula for maintaining access into body cavities and passages with built-in illumination means to provide optimum light upon specific and general regions in which surgical procedures are to be performed. Pharyngeal specula are disclosed in which light is provided by optical fibers which project the proper intensity upon the lymphatic areas of tonsils and adenoids so that surgery is easily accomplished. The fiber optics include a separate light source, connected by means of flexible optical fibers to the speculum, together with the termination of the fiber optics on the speculum to discharge the light at the desired area. A directable nozzle is disclosed for terminating the fiber optics whereby the light can be directed and maintained at the desired region. A plurality of nozzles are disclosed in combination with a variety of oral dams and tongue depressors for achieving maximized illumination on tonsils and adenoids during surgery thereon.

BACKGROUND OF THE INVENTION

(1) Field of the invention

This invention is directed to illuminating surgical specula and, more particularly, to pharyngeal specula which incorporate fiber optics to direct light at the desired regions of and around tonsils and adenoids during surgery.

(2) Description of the prior art

One of the principal problems in tonsillectomy and adenoidectomy surgery is the difficulty in obtaining adequate illumination. Prior illumination first comprised general overhead illumination of the usual type found in operating rooms. This was later directed by employment of a head mirror and, even later, illumination was accomplished by employment of a head lamp. Each of these illumination means is inadequate for various reasons, such as the varying illumination intensity in different zones within the pharyngeal cavity, and the varying amount of light in any particular area as the surgeon moves during the operation. Such changing illumination, together with the need to establish illumination of a proper area before further steps can be taken, delays the operation. Furthermore, a nurse must be in close attendance upon the operation so that she can be of direct aid to the surgeon. The same illumination problems occur for the nurse to an even greater extent because, while the nurse must see into the cavity, she has no control over the illumination thereof. Accordingly, delays are common, with the attendant mortality risks due to prolonged anaesthesia as well as other factors. Furthermore, the necessity for the surgeon to perform the surgical procedures in a manner such as not to interfere with or obstruct the light path imposes a severe burden and strain on his surgical technique, with possible detriment to the success or efficacy of the operation.

SUMMARY OF THE INVENTION

In order to aid in the understanding of this invention, it can be stated in essentially summary form that it is directed to an illuminating speculum. The speculum is of such a nature as to maintain itself removably fixed at a human anatomical opening, and to maintain illumination of the cavity through the opening. The illuminating speculum engages a body in removable relationship to the body and, when it is applied to a body opening, it remains in fixed position with respect to the body opening. The illuminator on the speculum illuminates the interior cavity and directed regions thereof for aid in diagnosis and surgery through the body opening maintained by the speculum.

Accordingly, it is an object of this invention to provide an illuminating speculum wherein the speculum is adapted to engage a human body in fixed relation to a body opening, so that it can be removably positioned with respect to the opening, together with an illuminator directably secured on the speculum to illuminate interiorly of the body opening. It is still another object of this invention to provide a pharyngeal speculum with illumination means thereon, which speculum can engage in the mouth opening to maintain a sufficient anatomical opening to permit pharyngeal lymphatic study and excision, including a light source on the speculum to provide proper illumination of the lymphatic areas. It is still another object to provide a pharyngeal speculum wherein the speculum includes an upper dam engaging at the upper teeth, which dam is provided with at least one light source which is directable at the tonsil, together with a tongue depressor which includes at least one light source directable at the adenoidal lymphatic processes. It is still another object of this invention to provide a speculum which maintains itself in fixed relationship to a body opening, together with illumination means on the speculum, which illumination means comprises a fiber optic light source secured to the speculum so that it is directed into an area in accordance with speculum positioning. It is still another object to provide a fiber optic light source with an illumination nozzle whereby the light emitted from the fibers is adjustably directable to the specific areas where illumination is desired.

Still other objects, features and attendant advantages of the present invention, together with various modifications, will become apparent to those skilled in the art from a reading of the following detailed description of the preferred embodiment constructed in accordance therewith, taken in conjunction with the accompanying drawings wherein like numerals designate like parts in the several figures.

BRIEF DESCRIPTION OF THE DRAWINGS

FIG. 1 is a side elevational view of the preferred embodiment of the illuminating pharyngeal surgical speculum of this invention, showing it in association with a partial section in phantom of a portion of a human head, illustrating the manner in which anatomical portions are retained and anatomical portions are illuminated by the pharyngeal speculum.

FIG. 2 is a top plan view thereof.

FIG. 3 is an enlarged section taken generally along lines 3—3 of FIG. 2.

FIG. 4 is a perspective view thereof.

FIG. 5 is an enlarged section taken generally along line 5—5 of FIG. 4.

FIG. 6 is a perspective view of another embodiment of the pharyngeal speculum of this invention.

FIG. 7 is an enlarged section taken through the clamps of the speculum of FIG. 6.

FIG. 8 is a view on reduced scale as seen generally along line 8—8 of FIG. 7.

FIG. 9 is an exploded view of the clamp of FIG. 7.

FIG. 10 is an exploded perspective view of another embodiment of the pharyngeal speculum of this invention.

FIG. 11 is an enlarged section taken generally along line 11—11 of FIG. 10, with a portion of the human mouth indicated in phantom.

FIG. 12 is an enlarged section taken generally along line 12—12 of FIG. 10.

DESCRIPTION OF THE PREFERRED EMBODIMENTS

Referring to the drawings, the preferred embodiment of the pharyngeal illuminating speculum is generally indicated at 10, in FIGS. 1, 2 and 4, and employs the general mechanical principles of the well known oral speculum disclosed in U.S. Pat. No. 2,476,675, to which the present invention is not confined but is used merely for illustrative purposes. The speculum 10 comprises tongue depressor 12 which is dimensioned to extend over the lower teeth and into the oral cavity and engage over the top of the tongue to hold the tongue in the depressed, out-of-the-way position. The blade of tongue depressor 12 preferably has a general downward curve on its outer end 14 to provide maximum visibility and space at the tonsil lymphoid tissue, generally indicated at 16. The tonsil tissue is bilateral, as is indicated in FIG. 2. Externally of the patient's mouth, tongue depressor 12 has a downwardly extending guide 18. Guide 18 slidably fits within guide channels 20 and 22 in dependent guide bar 24. The upper end of guide bar 24 carries loop 26, which is bilateral and extends upward and inward to form dam 28 which lies posteriorly of the upper teeth against the patient's hard palate. Guide 18 and guide bar 24 interlock by means of latch 30, which is of conventional nature, and thus provide a pharyngeal speculum structure which retains the tongue out of the way of adenoidectomy and tonsillectomy procedures. Furthermore, as indicated, it maintains the oral opening at a maximum distension for best access for the procedures.

The illumination provided upon the pharyngeal speculum 10 in accordance with the present invention permits these surgical procedures to be quickly completed with the maximum of efficiency because of the adequacy of light in the areas where it is required. Illumination source 32 is a conventional light source for supplying illumination to fiber optics. A lamp of suitable intensity and color provides the basic light flux. Filters remove the infrared and other unwanted segments of the spectrum, as desired for the particular procedure. The speculum 10 has four different locations from which light is directed from the speculum onto certain areas of the pharyngeal cavity. Accordingly, illumination source 32 may have four different, individual and separately controllable sources within the source 32 but, as illustrated, the illumination source 32 has two different and separately controllable illumination sources therein. The illumination sources are particularly arranged for the illumination of the input ends of bundles of optical fibers. Fiber bundles 34 and 36 are illustrated as being connected to the illumination source.

Fiber bundle 34 comprises two bundles 38 and 40 which are connected to the lower portion of guide bar 24. As is best seen in FIG. 5, guide bar 24 has fiber bundle channels 42 and 44 therein through which the fiber bundles 38 and 40 respectively pass. At the upper end of the guide bar 24, the fiber bundles 38 and 40 swing up through opposite sides of loop 26. On the upper side of loop 26, and laterally of dam 28, arms 46 and 48 respectively carry fiber bundles 38 and 40 into the mouth area. The arms are positioned so that they extend into the mouth, close to the hard palate and posteriorly of the front teeth. In view of the fact that the dimension from upper teeth to tonsils is usually within the range of from four to seven centimeters, and is about five centimeters in a five year old patient, for example, the light end preferably is about two centimeters posteriorally of dam 28. Furthermore, the arms 46 and 48 should be positioned above the bottom of the teeth, preferably about one centimeter above the bite plane. The foregoing dimensions and locations are preferred to maintain adequate clearance and access for the surgeon without interfering with his surgical procedures while, at the same time, maximizing the effectiveness of the illumination upon the desired regions. Arms 46 and 48 terminate in light nozzles 50 and 52, respectively, from which the fiber optic light is emitted. In order to properly illuminate the area at which the tonsillectomy is to be performed, these nozzles are directed substantially at the tonsil lymphoid tissue area 16. When the optics of such bundles produce an illuminated diameter substantially equal to the distance from the nozzle, as is generally the case, such a manner of direction is often adequate.

However, in order to best direct the light, particularly in cases where unusual conditions prevail or for the making of adjustments for tonsillectomy for different aged patients with resultant different pharyngeal cavities, nozzles 50 and 52 are made adjustable, as is best illustrated in detail in FIG. 3. Fiber bundle 40 is positioned interiorly of arm 48, which arm is directed to be properly positioned with respect to the teeth and the remainder of the oral cavity. Nozzle 52 has a hollow forward end to securely accommodate the bundle 40 which terminates at the face of the nozzle 52.

The rearward end of nozzle 52 is integrally provided with ball 54 thereon. Ball 54 is not a completely spherical ball but has an open rear end. It is simply more than hemispherical so that it can be retained in spherical seat 56 at the end of arm 48 by means of ball nut 58. Adjacent ball seat 56, ball 54 opens rearwardly into a conical opening so that the bundle has some flexibility thereat. Nozzle 52 thus can be directed within the limits of engagement of the nozzle in the opening at the front of the ball nut. The openings on the interior, in arm 48 and in ball 54, are sufficiently free to permit such motion without any damage to the fiber bundle. Accordingly, the nozzle can be directed anywhere in the solid conical angle defined by its limit stops.

The tightening of ball nut 58 retains the nozzle in the desired position. Both nozzles 50 and 52 are equipped in such manner, and thus each can be independently directed toward the area where illumination is desired. Illumination may cross within the oral cavity, or nozzles may be directed to illuminate the same general area. Thus, coincident illumination or overlapped illumination areas can easily be arranged. Accordingly, adjustably fixed illumination is available for tonsillectomy procedures.

For adenoidectomies, a suitable retractor is employed to hold the uvula forward so that it does not interfere with access or visibility toward the adenoid lymphatic tissues. These tissues are located generally in the nasopharynx and are indicated at 60 in FIGS. 1 and 2. Fiber bundle 36 from light source 32 is separated into two bundles 62 and 64 which extend up through guide 18 and through tongue depressor 12 (see FIGS. 2 and 5). Fiber bundles 62 and 64 respectively terminate in nozzles 66 and 68 which are positioned on the top surface of tongue depressor 12, and are generally directed toward the adenoidal tissue 60. Nozzles 66 and 68 are preferably directable, similarly to nozzles 50 and 52. Their preferred structure is illustrated in FIG. 12, described hereinafter. Thus, light from nozzles 66 and 68 illuminates the adenoid area where the adenotome and adenoidal curettage are applied. As is illustrated in FIG. 1, illumination source 32 is equipped with separate sources, with separate switches, so that the tonsil area light illumination can be actuated separately from the adenoidal illumination. Furthermore, it has been shown that there are actually four different light nozzles in a preferred embodiment and, accordingly, the four can be separately controlled in intensity by conventional power controls, if desired.

Another embodiment of the illuminating pharyngeal surgical speculum of this invention is generally indicated at 70 in FIG. 6. Speculum 70 is similar to speculum 10 in that it employs a tongue depressor 72 which is carried upon a guide 74. Guide 74 is equipped with fiber bundles 76 and 78 which extend from an illumination source to nozzles 80 and 81 on tongue depressor 72. Thus, adenoidal illumination by means of pharyngeal speculum 70 is identical to that for speculum 10.

However, speculum 70 has a loop 82 which terminates in a separate portion in dam 84 which is adapted to engage posteriorly of the teeth against the hard palate. Light nozzles 86 and 88 are secured onto loop 82 adjacent dam 84. They are supplied by a source of illumination through fiber bundles 90 and 92. The source of illumination for the fiber bundles 90 and 92, as well as the bundles 76 and 78, is conventional. The light nozzles 86 and 88 are respectively held in selected positions by means of clamps 94 and 96. Clamp 96 is illustrated in considerable detail in FIGS. 7, 8 and 9 and is described in connection therewith, it being understood that clamp 94 is identical.

Clamp 96 has, for its essential clamping element, U-clamp 98. U-clamp 98 has an opening therethrough to engage upon loop 82, and has a slot 100 therein to permit the U-clamp to lock upon loop 82. Screw 102 passes through hole 104 in the base of U-clamp 98, and is engaged by nut 106. Screw 102 has flat sides which engage in the flat sides of hole 104 to prevent rotation of the screw. Furthermore. screw 102 is slotted, as at 108, adjacent its conical head so that, when nut 106 is pulled down, the head of screw 102 is pulled down around its interior longitudinal hole 110. Fiber bundle 92 passes through the interior of screw 102, and fiber bundle 92 preferably is housed in a stainless steel tube or the like, to make it rigid in the indicated area. Thus, upon the tightening of nut 106, both screw 102 and U-clamp 98 are tightened. Screw 102 clamps upon the fiber bundle housing to maintain it in longitudinal positioning, and U-clamp 98 clamps upon loop 82 to prevent any changes in direction of the fiber bundle housing. Accordingly, light nozzles 86 and 88 can be individually directed to illuminate the desired areas.

Referring to FIGS. 10, 11 and 12, speculum 112 is generally indicated therein. Speculum 112 is another embodiment of the illuminating pharyngeal surgical speculum of this invention, wherein illumination is directed at desired areas for surgical action or other study or treatment. Pharyngeal speculum 112 comprises tongue depressor 114 which is very similar to tongue depressor 12 and has a generally conventional configuration. Tongue depressor 114 has tongue depressing portions 116 and guide 118, identical to guide 18. Guide 118 has passages therein for fiber bundles 120 and 122, which respectively extend from a conventional light source, as previously described, to the nozzles 124 and 126. As is seen in FIG. 12, nozzle 124 comprises a nozzle member which is mounted upon ball 128 and which carries the optical fiber 120 directly to the face of the nozzle. Ball 128 has a conical back opening therein, corresponding to a similar conical back opening 130 in the seat of the ball socket to permit the fiber bundle to flex as ball 128 is rotatably directed. The limit on ball rotation is provided by the amount of angular motion permitted by nozzle 124 within the limits of the opening in screw plug 132. Screw plug 132 engages on the ball to retain it in its socket with gentle frictional retention against rotation. Thus, the light nozzle in the tongue depressor can be directed so that light is discharged onto the desired areas to be illuminated.

The other portion of the speculum 112 comprises guide bar 134 substantially identical to guide bar 24. Fiber bundles 136 and 138 are secured to guide bar 134, and extend from a conventional light source as previously described. The bundles extend up through guide bar 134, and are combined in bar 140 of dam 142. If desired, only one set of fibers need be supplied to bar 140 for, while there are two nozzles mounted thereon, with the direction of light into different areas or zones, both can be supplied from halves of one bundle.

Dam 142 comprises padded tooth stops 144 secured onto bar 140. As is indicated in FIG. 11, dam 142 is designed to engage anteriorly of the upper teeth. However, in order to direct illumination into the correct areas, arms 146 and 148 (see FIGS. 10 and 11) extend off bar 140 in the rearward oral cavity direction. Arms 146 and 148 terminate in nozzles 150 and 152 respectively. These nozzles are identical to nozzles 50 and 52, and need not be further described herein other than to note that arms 146 and 148 may curve upwardly toward the hard palate so as to locate nozzles 150 and 152 more upwardly than shown.

By employment of any one of the specula of this invention, adequate illumination is provided into the pharyngeal cavity for tonsillectomy, adenoidectomy and other procedures and treatments. However, it is clear that, while the speculum is described in its preferred embodiment as being particularly useful in the oral cavity for these purposes, it is also clear that it is useful in fixing an illumination source with respect to any body opening so that, while treatment or surgery is being performed within the body cavity, the speculum fixedly retains the light source in the adjustably correct position for distribution of proper illumination onto the areas where such is required for the procedure.

This invention having been described in its preferred embodiment, it is clear that it is susceptible to numerous modifications and embodiments within the ability of those skilled in the art and without the exercise of the inventive faculty.

What is claimed is:

1. An anatomical device, said anatomical device having anatomical engagement means thereon, said engagement means comprising a dam shaped to engage dental tissue adjacent the upper teeth of the oral anatomical opening and a tongue depressor shaped to engage the tongue of an oral cavity;

illumination means secured to said dam and extending partway into the oral anatomical cavity to illuminate a portion of the anatomical cavity within the opening; said illumination means comprising fiber optic means having a substantially rigid structure in said dam and a substantially flexible structure between an illumination source and said dam, said substantially rigid structure comprising a substantially rigid tube having a bundle of optical fibers therein for the transmission of light through said tube, and a nozzle on the end of said substantialily rigid tube, said nozzle being directable with respect to the remainder of said tube so that the discharge of light can be directed.

2. The device of claim 1 wherein said nozzle comprises a ball and a socket, said bundle of fibers passing through said ball and through said socket, said ball and said socket each having an enlarged opening in adjacent faces to permit limited rotation of said ball in said socket on an axis normal to said bundle without damage to said bundle of fibers.

3. The device of claim 2 wherein said ball has a clamp engaging thereon, said clamp being tightenable with respect to said ball to lock said ball with respect to said tube so that said nozzle can be directed and locked in place.

References Cited

UNITED STATES PATENTS

| 3,504,984 | 4/1970 | Bush | 350—96 X |
|---|---|---|---|
| 1,388,170 | 8/1921 | Cameron | 128—16 |
| 1,388,421 | 8/1921 | Forgrave | 128—12 |
| 3,091,235 | 5/1963 | Richards | 128—6 |

CHANNING L. PACE, Primary Examiner

U.S. Cl. X.R.

128—16; 350—96